United States Patent [19]

Kogan et al.

[11] Patent Number: 5,464,501
[45] Date of Patent: Nov. 7, 1995

[54] BLEACHING RECYCLED PULP WITH A REDUCTIVE-OXIDATIVE SEQUENCE

[75] Inventors: Jack Kogan, Skokie, Ill.; Michel Muguet, Voisin le Bretonneaux, France

[73] Assignee: Societe Anonyme pour l'Etude et l'Exploitation l'Air Liquide, des Procedes Georges Claude, Paris, France

[21] Appl. No.: 173,674

[22] Filed: Dec. 23, 1993

Related U.S. Application Data

[63] Continuation-in-part of Ser. No. 91,158, Jul. 12, 1993, abandoned, which is a continuation-in-part of Ser. No. 44,369, Apr. 6, 1993, abandoned.

[51] Int. Cl.⁶ ............................... D21C 5/02; D21C 9/153
[52] U.S. Cl. .......................... 162/6; 162/7; 162/8; 162/65
[58] Field of Search ................................ 162/6, 7, 8, 65, 162/65 B

[56] References Cited

U.S. PATENT DOCUMENTS 3,318,657  5/1967  Wade ..................................... 162/65 B
5,211,809  5/1993  Naddes et al. .............................. 162/7

FOREIGN PATENT DOCUMENTS 191756   8/1986  European Pat. Off. .................. 162/84
2901942  8/1979  Germany .................................. 162/7

OTHER PUBLICATIONS

Angulo "Environmentally Safe Bleaching of Post Consumer Waste Papers" TAPPI Conference Oct. 1990.

*Primary Examiner*—Karen M. Hastings
*Attorney, Agent, or Firm*—Malcolm B. Wittenberg

[57] ABSTRACT

The invention relates to a method of bleaching waste paper pulp. The pulp is first treated to a reductive chemical followed by acidification and washing or dewatering. The pulp is then subjected to ozone and then to hydrogen peroxide. The reductive chemical used is either formamidine sulphinic acid or sodium hydrosulfite.

15 Claims, 2 Drawing Sheets

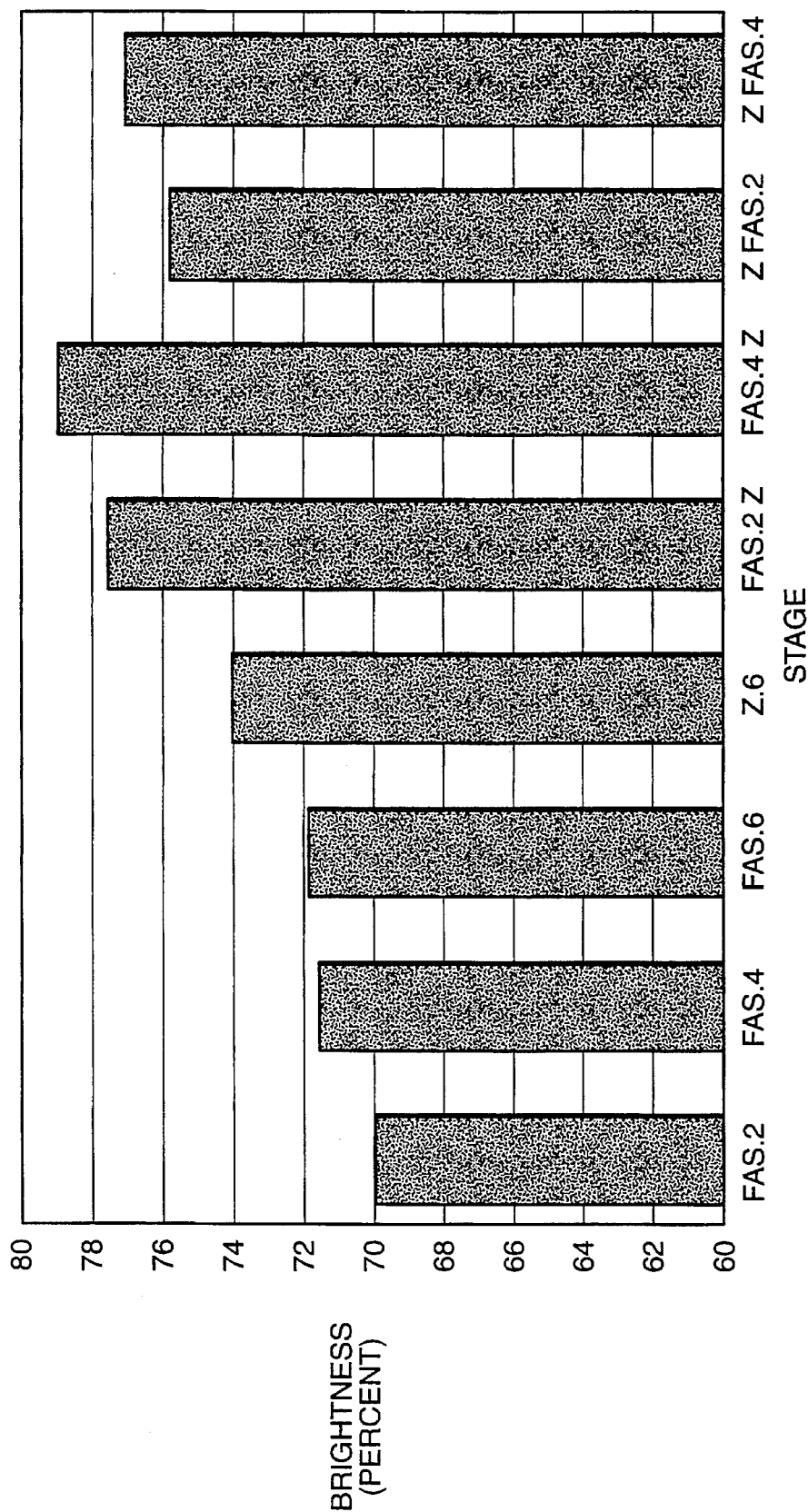
FIG._1

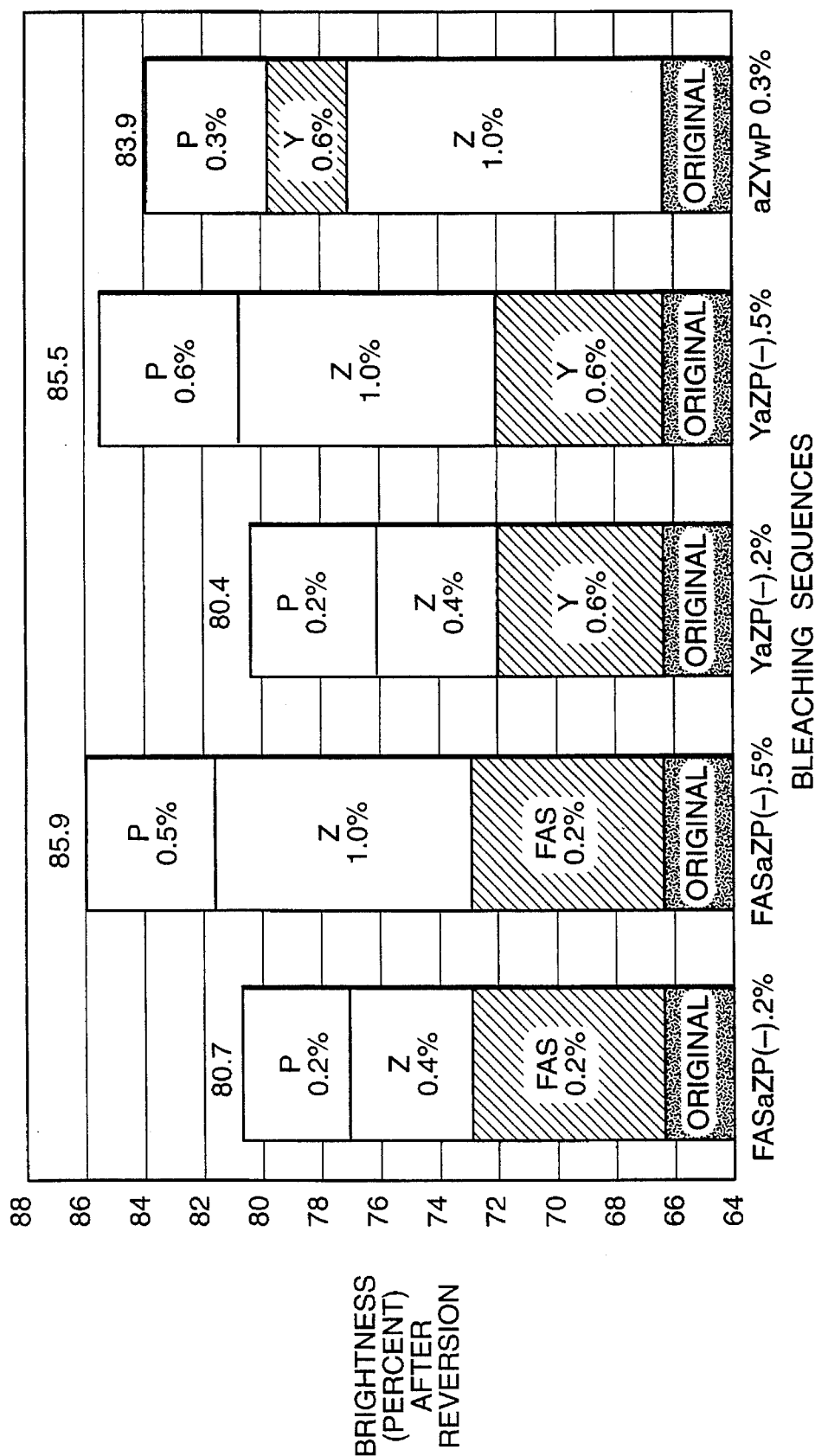
FIG._2

BLEACHING RECYCLED PULP WITH A REDUCTIVE-OXIDATIVE SEQUENCE

This application is a continuation-in-part of application Ser. No. 08/091,158 filed Jul. 12, 1993, now abandoned, which is a continuation-in-part of application Ser. No. 08/044,369, filed Apr. 6, 1993, now abandoned.

BACKGROUND OF THE INVENTION

As society becomes increasingly environmentally conscious, there has been a growing trend to recycle a wide variety of consumable products including newspapers and other wood pulp-based materials.

Deinked waste fiber from chemical pulp products has been usually bleached by chlorine-based compounds, specifically chlorine and sodium hypochlorite. However, the industry starts moving away from chlorine for environmental concerns and this trend has been perceived as well in the recycled paper industry. Sodium hypochlorite is also perceived to be a chlorine compounds producer in effluent streams and air emissions and, as a result, is also an environmental concern. As such, there is now a growing interest to use ozone and/or hydrogen peroxide in the bleaching of recycled pulps.

It is known, for example, from "Cellulose Chemistry and Technology," 23-307-319 (1989) to bleach pulp with ozone. However, ozone degrades cellulose which consequently generates an important decrease of the polymerization degree of said cellulose which in turn decreases mechanical strength of the pulp.

In the article entitled "Upgrading of Waste Paper with Hydrogen Peroxide," O. Helmling, *Recycling Paper from Fiber to Finished Products,* pg. 714–724, is disclosed the upgrading of pulp from waste paper with hydrogen peroxide added during repulping; otherwise, the pulp will yellow particularly under alkaline conditions. Alkaline repulping is usually considered as being necessary for dissolving the pulp fiber structure and for dislodging ink particles from fibers by the swelling process.

However, it is necessary to stabilize hydrogen peroxide when it is added to the pulp, because hydrogen peroxide is decomposed by heavy metal ions and/or consumed by other organic fine material found in waste paper and/or dilution water. In early deinking processes carried out with hydrogen peroxide, up to 5% sodium silicate was added to the pulp as a stabilizer. However, because of scaling-up problems and reduced efficiency of the retention aids for paper manufacture, a number of chelating agents were developed as substitutes for sodium silicate as a stabilizer for hydrogen peroxide, as disclosed by Indresh Mathur in "Chelant Optimization in Deinking Formulation," 1*st Research Forum on Recycling,* October 1991, pp. 1–7. In any event, regardless of the stabilizer employed, it is believed to be necessary by the person skilled in the art to use some stabilizer for hydrogen peroxide particularly in light of the metal ion decomposition problem referred to previously.

Presently, and as disclosed in the article entitled "Alternative Methods for Bleaching Post Consumer Waste Papers" J. E. Angulo, August 1991, Tappi Journal, there is a need for environmental-friendly process to bleach recycled pulp.

It is also disclosed in EP 514,901 a method to remove color from a recycled pulp made of waste papers to contact said pulp with oxygen or an oxygen containing gas which oxygen reacts with the color-causing compounds present in said pulp thereby bleaching said recycled pulp to make a recycled paper product. This oxygen bleaching step already well-known from the literature, might be followed by subsequent steps comprising (Z) ozone, hydrogen peroxide (P), etc. Prior to this oxygen stage or after, the pH of the pulp might be adjusted either at low pH or at high pH, avoiding the 8–10 pH zone. Subsequent Z, P, H stages might be provided.

The results indicate a slight bleaching action of oxygen alone, which action is enhanced by further stages, already known for their bleaching actions. The brightness obtained (which is not indicated whether it is prior to or after reversion) is rarely above 80, usually with long sequences.

It is known from the article entitled "Bleaching of secondary fibre pulps" —B. Van Lierop and N. Liebergott— First Research Forum on Recycling, Toronto, October 29–31, 1991—p 175–182 to treat recycled pulps from various fibre sources with Ozone (Z), hypochlorite (H), sodium hydrosulfite (Y) or formamidine sulphinic acid (FAS) bleaching stages.

One of the conclusions of this article is that an ozone bleaching stage followed by a sodium hydrosulfite (Y) stage which is a reductive stage is better than an ozone sodium hypochlorite sequence which is better than an ozone peroxide sequence; Table VII of this article also suggest that in order to obtain the best brightness of a pulp comprising recycled pulp, the ozone-hydrogen peroxide sequence must be followed by a sodium hydrosulfite (Y) sequence, i.e. a reductive sequence.

Contrary to the general teaching of the prior art, it has been discovered that applying reductive agents (and particularly sodium hydrosulfite) prior to applying an ozone/hydrogen peroxide sequence to a pulp comprising recycled pulp, enhances the effect of the overall combination of bleaching steps, i.e. improves the brightness of said pulp comprising recycled pulp after reversion. It has also been discovered that for certain recycled pulps the ozone sequence should be carried out at a pH which is greater than 7, and preferably between 8 and 11. For some other recycled pulps the ozone sequence should be carried out at a pH which is lower than 7 and preferably between 2 and 3.

In addition to that, the brightness of the pulp after reversion remains improved, sometimes even without using protective additives, usually added to avoid hydrogen peroxide decomposition by metallic ions.

As explained in the TAPPI publication TIS 0606-21— issued 1988—entitled "Recommended pulp bleaching stage designation method", an ozone (Z)/hypochlorite (H) sequence comprises usually two separate stages, a Z stage and an H stage with a washing or a pressing step between those two stages (first page—right column). In this case this sequence is designated as a ZH sequence. When those two stages are not separated by such a washing or pressing step, the sequence is named Z/H. When ozone and hypochlorite stages are done simultaneously, the sequence is designated as (Z+H) (see FIG. 7 of the article). However, when ozone and hypochlorite are added sequentially with the pulp in between points of addition, but with no washing or pressing, and before a common retention tower, the sequence is designated as (ZH)—see FIG. 10.

It is an object of the present invention to provide a chlorine-free bleaching process comprising a reductive step such as a sodium hydrosulfite (Y) step before the ozone (Z) and hydrogen peroxide (P) steps.

It is another object of the invention to provide an ozone (Z) and hydrogen peroxide (P) bleaching process which provides less brightness reversion than the usual ozone and hydrogen peroxide process.

This and further objects will be more readily apparent when considering the following disclosure and appended claims.

SUMMARY OF THE INVENTION

The present invention deals with a method of bleaching deinked pulp made of recycled paper. It relates to a method of bleaching waste paper pulp comprising the steps of treating said pulp with at least one reductive chemical and then subjecting said pulp to an oxidative treatment which comprises an ozone (z) and a hydrogen peroxide (p) step. The reductive chemical used in the reductive—oxidative sequence according to the invention is preferably selected from the group comprising sodium hydrosulfite, formamidine sulfinic acid (FAS), sodium borohydride and mixtures thereof.

The ozone treatment can be carried out either in acidic, neutral or alkaline conditions, depending on the type of chemicals, particularly dyes, which are present in the waste paper. To determine which pH conditions are the best for a recycled pulp, a pH test such as the following test might be first carried out: three samples of pulp having a weight between 40 to 100 g. are prepared, then diluted with distilled water to obtain a 1% consistency pulp. The pH of each sample is then adjusted:

sample 1: pH 2.5 sample 2: pH 7.0 sample 3: pH 10.5

The samples are then dewatered in preparation for the next Z stage. Then high consistency samples are made from those three samples and contacted with ozone (1% ozone by weight of oven dry pulp).

Handsheets of every sample are made and their brightness measured. The sample having the highest brightness indicates the proper pH to be implemented on the pulp during the ozone bleaching stage according to the process of the invention.

While many of the recycled pulps which have been tested exhibit a better brightness with an acidification step before the ozone treatment step, some pulp have shown a better brightness in alkaline or sometimes neutral conditions. After the reductive treatment stage, it is thus important to measure the pH of the pulp and adjust it if necessary according to the results of the pH test as disclosed hereabove. In some other cases it is anyway preferable to provide an acidification stage after the reductive stage but prior to the ozonation stage, even if said ozonation stage may be carried out in alkaline conditions. It has been discovered according to one aspect of the present invention that an acidification stage prior to the ozonation stage, followed by a washing or dewatering step of the pulp before pH adjustment (if necessary) and ozonation stage allowed to avoid incorporation of protective silicates (or equivalent products) in order to properly carry out the peroxide stage following the ozonation stage. This acidification stage provides for solubilization of metallic ions (when they are present in the pulp) in the water, which ions are then eliminated during the dewatering or washing step. These metallic ions are supposed to be responsible for decomposition of hydrogen peroxide (in the peroxide stage) which hydrogen peroxide cannot bleach the pulp as it should be.

When an acidic treatment is necessary, the pH of the pulp is usually adjusted between about 2 and 3, preferably about 2.5, by addition of an acid, preferably oxalic and/or sulfuric acid or any other acid able to achieve this pH.

When an alkali treatment is necessary, the pH of the pulp is usually adapted between 8 and 11 with an appropriate alkali which is preferably selected from the group comprising sodium hydroxide, sodium carbonate, ammonium hydroxide and mixtures thereof.

According to the present invention, the ozone/hydrogen peroxide sequence can be, according to the TAPPI definition referred to hereabove, a ZP, (Z/P), (Z+P) or (ZP) sequence. The ozone stage of each of those sequences can be either a usual Z stage, well known by the man skilled in the art or a Z/P stage (Z/P$^{(-)}$ or Z/P$^{(+)}$ as disclosed in the application Ser. No. 08/044,369 filed Apr. 6, 1993, now abandoned, incorporated herein by reference.

DETAILED DESCRIPTION OF THE DRAWINGS

FIG. 1 represents the brightness of the pulp vs. different sequences Z, FAS, FAS/Z and Z/FAS.

FIG. 2 represents the brightness after reversion for different bleaching sequences FAS ZP, YZP and ZYP.

DETAILED DESCRIPTION OF THE INVENTION

As noted previously, bleaching of deinked paper stock has traditionally involved the use of chlorine-containing compounds such as sodium hypochlorite and chlorine itself. These oxidizing agents have been used to bring waste paper brightness to 80% ISO or higher. Such recycled products have been used to produce high quality printing and writing papers as well as tissue and towel products. Because of recent environmental concerns, the industry has begun to move toward replacement of chlorine-containing chemicals with oxygen-containing compounds, such as oxygen, ozone and hydrogen peroxide.

In employing the protocol for the oxidative bleaching of pulp made of recycled paper, in many cases a first acidic ozone treatment followed by exposure to hydrogen peroxide has been found to be quite useful. Ozone gas can be effectively applied to the pulp as a bleaching agent. Chemical charges and other conditions may vary according to the raw materials and type of technology available. The ozone stage produces good results but certain brightness reversion is observed after the treatment.

In order to minimize reversion, the ozone charge is followed with exposure of the pulp to hydrogen peroxide. However, in many cases, metal ions and other substances present in the pulp decompose hydrogen peroxide and make the chemical reaction less efficient. To avoid that, protective agents such as silicates and DTPA have been employed. The use of such stabilizers increases the cost of the bleaching process.

It has further been found that surprisingly good results are achieved when the oxidative bleaching process is preceded by exposure of the pulp to a reductive agent such as sodium hydrosulfite or formamidine sulfinic acid (FAS) although various articles such as Putz, H. J. et al., "Bleaching of Waste Paper", *Recycling of Paper: From Fiber to Finished Product*, Tappi Press, pp. 683–97, indicate that waste paper can be treated with different chemicals such as those described above in a single or multi-stage bleaching process. This article describes a number of reductive and oxidative agents. However, it further teaches that best results were obtained when the oxidative stage was applied first. However, it has now been found that when the reductive stage is applied prior to the ZP sequence, enhanced brightness is achieved.

Confirmation of the present invention was made by simply varying the amounts of FAS and ozone either alone or in combination while, in some instances, subjecting the pulp to FAS first and in other instances to ozone first.

In referring to FIG. 1, the original ISO brightness was again approximately 63.5%. It is noted that FAS alone did not improve brightness as much as ozone alone while the combination of FAS and ozone resulted in dramatic brightness increases. However, it is quite clear that the most dramatic results were achieved when the reductive FAS stage preceded the oxidative ozone stage.

FIG. 2 represents the brightness after reversion for different bleaching sequences. Five different sequences were carried out employing either FAS or Y (sodium hydrosulfite) as the reductive agent, preacidification "a" with $H_2SO_4$, a "Z" ozone stage and optional "W" washing stage followed by a hydrogen peroxide (P) as an oxidative either with the addition of protective silicates "P+" or without such protective agents "P(−)". For example, the sequence "Y 0.5% a Z 0.6% w P(−) 0.3%" is read as an initial 0.5% charge of sodium hydrosulfite as a reductive agent followed by preacidification with $H_2SO_4$ to pH 2.5 followed by an ozone charge of 0.6% with a washing step culminating in hydrogen peroxide charge of 0.3% with no additives. In each instance, the pulp had an initial brightness of approximately 63.5%. It was noted that good results were achieved when the reductive step, be it FAS or Y, preceded the oxidative sequence. It is contemplated that excellent results are achieved when approximately 0.2% FAS or approximately 0.5% hydrosulfite is used in the reductive stage. It is further contemplated that between 0.4% to 1.0% ozone is optimal while approximately 0.2% to 0.5% hydrogen peroxide is to be used without the need of additives or protectors for peroxide.

A further attempt was made to study the effect of DTPA at the beginning of the reduction/oxidation sequence to chelate metal ions that interfere with the oxidative process. However, an attempt was made to determine whether DTPA would also affect the reductive stage. It was also experimentally determined whether the preacidification step with either, for example, oxalic or sulfuric acid would optimize results if carried out before the reductive step or, as noted above, after the reductive step but before the application of ozone.

Four samples were treated with the reductive-oxidative sequence YZP varying the position and nature (with or without DTPA) of the acidic treatment and sequence. Sample 1 represents the "standard" cycle, i.e., YAZP with no DTPA. In Sample 2, acidification took place in front of the sequence, i.e., AYZP with no DTPA addition. Sample 3 was pretreated with DTPA at a pH of 2.5 before YZP. In this instance, no "a" preacidification step was applied before Z. Instead, the pulp was washed with water at pH 7 before the ozone treatment. Finally, Sample 4 was treated with DTPA in front of the sequence at pH 2.5 and acidification with $H_2SO_4$ between the Y and Z stages was also carried out. The following tabulated results were achieved expressed in brightness percent (before reversion):

TABLE 1

| SAMPLE | T | A | Y | A | Z | | P |
|---|---|---|---|---|---|---|---|
| 1 YaZP | | | 77.2 | X | 80.3 | (NW) | 85.2 |
| 2 aYZP | | X | 76.9 | (NW) | 80.0 | (NW) | 83.6 |
| 3 TYZP | X | | 76.3 | (W) | 80.4 | (NW) | 83.8 |

TABLE 1-continued

| SAMPLE | T | A | Y | A | Z | | P |
|---|---|---|---|---|---|---|---|
| 4 TYaZP | X | | 76.3 | X | 81.0 | (NW) | 85.4 |

Wherein:

Y=0.5% $NA_2S_2O_4$, 60 minutes, 5% consistency, 60° C, pH 6.3

Z=0.7% $O_3$, 35% consistency

P=0.3% $H_2O_2$, no additives (DTPA and silicates), 45 minutes, 50° C. pH 10.5 10% consistency T=0.5% DTPA, pH 2.5 ($H_2SO_4$), 30 minutes, 55° C.

a=acidification with sulfuric acid, pH 2.5, 30 minutes w=washing nw=no washing

In addition to the four samples presented in Table 1, two more samples of the same pulp were treated with FAS (0.2%) instead of Y. The results of the six experiments are summarized in Table 2 as follows:

TABLE 2

| SEQUENCE | BRIGHT. BEFORE REV. | BRIGHT. AFTER REV. |
|---|---|---|
| Y a Z (nw) P | 85.2 | 83.7 |
| a Y (nw) Z (nw) P | 83.6 | 81.3 |
| T Y (w) Z (nw) P | 83.8 | 81.8 |
| T Y a Z (nw) P | 85.4 | 83.5 |
| FAS a Z (nw) P | 85.4 | 83.9 |
| a FAS (nw)Z (nw) P | 83.7 | 81.9 |

Certain conclusions were reached from the above-recited experimental data. Firstly, DTPA treatment (to chelate metal ions) prior to YZP does not affect brightness development when employing the above-described reductive/oxidative sequence. Secondly, the difference in brightness is affected by the position of acidification in the bleaching sequence. Acidification prior to the reductive step (Y or FAS) produces lower brightness than acidification before ZP but after the reductive stage.

Throughout the description of the present invention, the various terms which are used have the following meaning:

REDUCTIVE STEP

Formamidine Sulfinic Acid (FAS)

The pH of the sample is adjusted to 7.0. FAS is then added to the pulp under a stream of Nitrogen gas. Next, $N_2aOH$ (about ½ of the amount of FAS) is added to the sample also under $N_2$ gas. The pulp sample is sealed, mixed and kept at 60–70 degrees C during 2 or 3 hours. Consistency of the stage is 3–5%.

Sodium Hydrosulfite (Y)

The sample is brought to a consistency of 4% and pH is adjusted to 6.0–6.5. Sodium hydrosulfite is added under a stream of $N_2$. The sample is kept for one hour at about 65° C.

OXIDATIVE STEP

Acidification (optional)

Acid is added to the pulp to reach a pH between 2 and 3, preferably 2.5. At this point, consistency may range between 1 and 5%. Acids as oxalic, sulfuric and others can be used for this purpose. The use of sulfuric acid is particularly efficient when the acidic step is carried out at temperatures between 50° and 90° C. Oxalic acid performs well at room temperature (20°–25° C).

DEWATERING

After acidification, the sample is dewatered to remove undesirable metal ions. Also, a regular washing step will help to remove ions from the pulp. The degree of dewatering-washing will be dependent on the type of technology (high, medium or low consistency) that would be used in the next ozone and peroxide stages. For example, if the ozone treatment is carried out at high consistency (35–45%), the excess of water present in the furnish at 1–6% consistency has to be removed using regular equipment (twin press, etc.)

OZONE (Z) STAGE

High or medium consistency technology can be used to apply ozone to the pulp. High consistency requires the pulp to be fluffed. The concentration of ozone in carrier gas may vary according to the type of ozone generator. Pressure of the gas is about 1.5 atm. Temperature of the reaction ranges from 10° to 60° C. Higher temperatures may decompose ozone, making the reaction less efficient. Reaction time is short, and varies according to reactors configuration.

On the other hand, medium consistency technology requires fluidization of the pulp. Gas is pressurized at 6 to 10 atmospheres and injected to a fluidizer-mixer-reactor. Retention time may vary according to general configuration of the equipment.

For medium or high consistency, the charge of ozone may vary according to the target brightness. When treating recycled wood-free pulp, the charge of ozone on dry pulp ranges between 0.3 and 2%.

PEROXIDE (P) STAGE

When acid treatment has to take place, metal ions were already removed then the P stage does not require protectors such as DTPA or silicates to prevent $H_2O_2$ decomposition and to make the stage more efficient. Peroxide (0.3–1.0%) is applied to the pulp at 50°–70° C., during 45–120 min. retention time, adjusting the pH of the furnish to about 11 with NaOH.

This is a simplified P stage because it does not require additives nor long retention time, nor high temperatures to achieve excellent performance.

A further particular high consistency ozone treatment is given hereunder:

Example: Reductive -a-Z-P

Deinked pulp (40 gr) containing less than 4% mechanical pulp and with an initial brightness of 67% ISO, was diluted with water to reach 4% consistency. The pH of the sample was adjusted to 6.2. Under $N_2$ stream, 0.5% (on dry pulp) of sodium hydrosulfite was added, and mixed with the pulp. After one hour at 65 degrees C, the reaction was stopped by adding water at 50° C. to reach 2.5% consistency.

Sulfuric acid was added to obtain a pH of 2.5. Then the sample was dewatered in a centrifuge to a consistency of about 38%. Next, the pulp was fluffed using a laboratory fluffer, and consistency was measured.

The pulp was placed in a rotary evaporator and ozone gas produced by a 7 gr/hr ozone generator was injected to the reactor. The amount of ozone injected was determined by injection time, and according to ozone concentration measured by iodometric titration. In this case, the ozone charge was 0.5% on dry pulp. Injection time was about 3 minutes.

Finally, the sample was diluted to 12% consistency, and NaOH (0.4%) was added to reach pH 11. Hydrogen peroxide (0.3%) was added to the pulp, and the sample was kept for 45 min at 50° C.

The final brightness of the sample (after reversion test) was 84% ISO).

We claim:

1. A method of bleaching waste paper pulp consisting of a first step of treating said pulp with a reductive chemical selected from the group consisting of formamidine sulphinic acid and sodium hydrosulfite followed by a second step consisting of an oxidative treatment wherein said oxidative treatment exposes said pulp to ozone and hydrogen peroxide and wherein the pH of the pulp is adjusted in between said first and second steps.

2. The method of claim 1 wherein the pH of said pulp is adjusted to between about 2 and 3 by treating said pulp with an acid between said first and second steps.

3. The method of claim 2 wherein to bleach a pulp comprising metallic ions, an effective amount of acid is used to solubilize substantially all of the metallic ions.

4. The method of claim 2 wherein the acid selected from the group consisting of oxalic and sulfuric acids.

5. The method of claim 1 wherein the amount of formamidine sulfinic acid is between about 0.1% to about 1.0% by weight of dry pulp.

6. The method of claim 1 wherein the amount of formamidine sulfinic acid is between about 0.1% to 0.4% by weight of dry pulp.

7. The method of claim 1 wherein the amount of sodium hydrosulfite is between about 0.1% to about 2% by weight of dry pulp.

8. The method of claim 1 wherein the amount of sodium hydrosulfite is between about 0.1% to about 1% by weight of dry pulp.

9. The method according to claim 1 wherein the amount of ozone is between 0.1% and 2% by weight of dry pulp.

10. The method according to claim 1 wherein the amount of ozone is between 0.2% to 1% by weight of dry pulp.

11. The method according to claim 1 wherein the amount of hydrogen peroxide is between 0.2% to 2% by weight of dry pulp.

12. The method according to claim 1 wherein the pH of the pulp is adjusted to between about 8 and 11 by treating said pulp with an appropriate alkali between the first and the second steps.

13. The method according to claim 12 wherein the alkali is selected from the group consisting of sodium hydroxide, sodium carbonate, ammonium hydroxide and mixtures thereof.

14. A method of bleaching waste paper pulp consisting of a first step of treating said pulp with a reductive chemical selected from the group consisting of formamidine sulphinic acid and sodium hydrosulfite followed by a second step consisting of an oxidative treatment wherein said oxidative treatment exposes said pulp to ozone and hydrogen peroxide and wherein a pH test is conducted on samples of the pulp prior to said first step, said pH test consisting of the steps of making several pulp samples, adjusting the pH of different samples to different values, contacting said samples with ozone under the same conditions and then measuring the brightness of each sample in order to determine the most appropriate pH for the pulp at least during the exposure to ozone in said second step whereby said pulp is treated to ozone in said second step at said most appropriate pH.

15. A method of bleaching waste paper pulp consisting of a first step of treating said pulp with a reductive chemical selected from the group consisting of formamidine sulphinic acid and sodium hydrosulfite followed by a second step consisting of an oxidative treatment wherein said oxide five treatment exposes said pulp to ozone and hydrogen peroxide and wherein said pH of the pulp is adjusted in between said first and second steps to between about 2 and 3 by treating said pulp with an acid between said first and second steps wherein said pulp is washed after said acid treatment and prior to subjecting the pulp to ozone.

\* \* \* \* \*